(12) United States Patent
Nakamura et al.

(10) Patent No.: US 11,586,263 B2
(45) Date of Patent: Feb. 21, 2023

(54) INFORMATION PROCESSING APPARATUS AND CONTROL METHOD

(71) Applicant: LENOVO (SINGAPORE) PTE. LTD., Singapore (SG)

(72) Inventors: Atsunobu Nakamura, Yokohama (JP); Takuroh Kamimura, Yokohama (JP); Akinori Uchino, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 17/449,474

(22) Filed: Sep. 30, 2021

(65) Prior Publication Data

US 2022/0326750 A1 Oct. 13, 2022

(30) Foreign Application Priority Data

Apr. 12, 2021 (JP) .............................. JP2021-067328

(51) Int. Cl.
*G06F 1/20* (2006.01)
*G06F 1/26* (2006.01)

(52) U.S. Cl.
CPC . *G06F 1/26* (2013.01); *G06F 1/20* (2013.01)

(58) Field of Classification Search
CPC ..... G06F 1/20; G06F 1/26; G06F 1/30; G06F 1/32
See application file for complete search history.

(56) References Cited

U.S. PATENT DOCUMENTS

| 8,850,251 | B1* | 9/2014 | Maeng ................. G06F 1/3234 713/323 |
| 2008/0194300 | A1* | 8/2008 | Rofougaran .......... G06F 1/3296 455/574 |
| 2010/0191385 | A1* | 7/2010 | Goodnow ............. G06F 1/3203 700/291 |
| 2012/0210325 | A1* | 8/2012 | de Lind van Wijngaarden .......... H04W 52/0258 718/103 |
| 2014/0215239 | A1* | 7/2014 | Kovatchev ........ H04W 52/0264 713/320 |

FOREIGN PATENT DOCUMENTS

WO 2010026185 A1 3/2010

* cited by examiner

*Primary Examiner* — Mark A Connolly
(74) *Attorney, Agent, or Firm* — Shimokaji IP

(57) ABSTRACT

An information processing apparatus includes a processor that can take plural power control modes different in rated power from one another, a fan that rotates to dissipate heat generated by the processor, and a power control unit that controls the power consumption of the processor. The plural power control modes include two or more stages of dynamic control modes different in rated power from one another and a unified communication mode. The power control unit selects any one of the dynamic control modes based on an event in which a power consumption state of the processor continues for a predetermined duration or more, and when the unified communication works, the power control unit preferentially selects the unified communication mode.

5 Claims, 5 Drawing Sheets

| POWER CONTROL MODE | | LOW NOISE (Q) | BALANCE (B) | HIGH PERFORMANCE (P) | UC (U) |
|---|---|---|---|---|---|
| TARGET TEMPERATURE [°C] | | TEM1 | TEM2 | TEM3 | TEM4 |
| NOISE UPPER LIMIT [dB SPL] | | SND1 | SND2 | SND3 | SNDu |
| SET POWER [W] | PL112 | PO112 | PO112 | PO112 | PO112u |
| | PL111 UPPER LIMIT | PO111qu | PO111bu | PO111pu | PL111uu |
| | PL111 LOWER LIMIT | PO111ql | PO111bl | PO111pl | PL111ul |

FIG. 5

| POWER CONTROL MODE | STATE | DURATION |
|---|---|---|
| CPU: UC (U) | UC app = ON | — |
| CPU: HIGH PERFORMANCE (P) | CPU Power ≥ SP113 | T113 |
| CPU: BALANCE (B) | CPU Power ≥ SP112 | T112 |
| CPU: LOW NOISE (Q) | CPU Power ≤ SP121 | T121 |
| CPU: BALANCE (B) | CPU Power ≤ SP122 | T122 |

FIG. 6

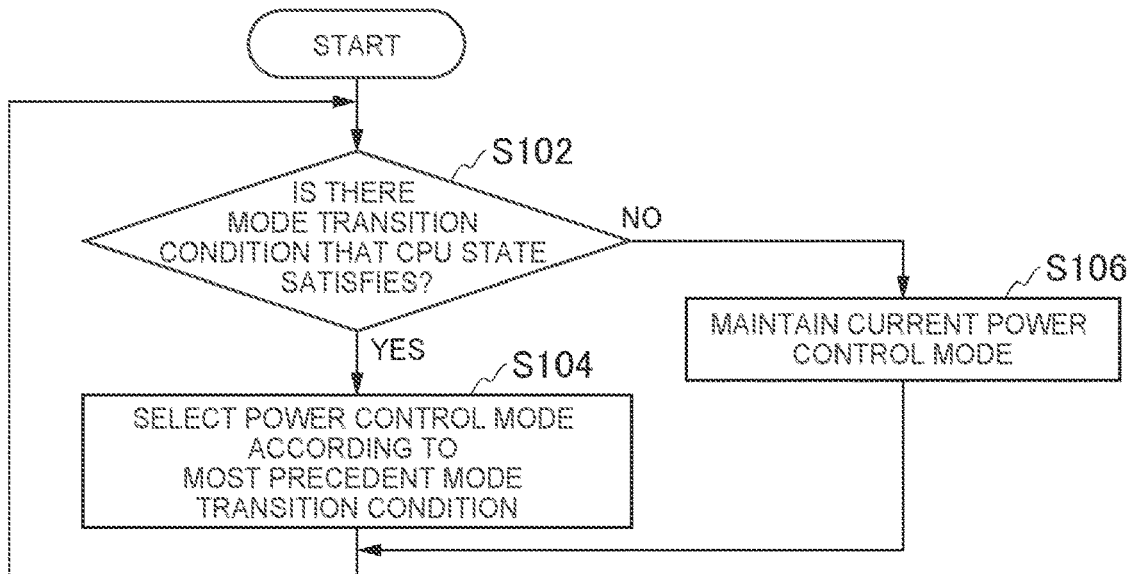

FIG. 7

| POWER CONTROL MODE | STATE | DURATION |
|---|---|---|
| CPU: UC (U) | UC app = ON | — |
| CPU: HIGH PERFORMANCE (P) | CPU Power ≥ SP113 | T113 |
| CPU: BALANCE (B) | CPU Power ≥ SP112 | T112 |
| CPU: LOW NOISE (Q) | CPU Power ≤ SP121 | T121 |
| CPU: BALANCE (B) | CPU Power ≤ SP122 | T122 |

FIG. 8

| NAME | TYPE |
|---|---|
| App01.app | UC |
| App02.app | UC |
| App11.app | DOCUMENT |
| App12.app | SPREADSHEET |
| App21.app | CAD |
| App31.app | GAME |

FIG. 9

INFORMATION PROCESSING APPARATUS AND CONTROL METHOD

FIELD OF THE INVENTION

The present invention relates to a technique for controlling the power consumption of an information processing apparatus.

BACKGROUND OF THE INVENTION

Various forms of communication services are used for communication between remote areas. For example, as typical communication services, there are voice call, video conferencing, instant messaging, providing presence information, and the like. An information processing apparatus including plural kinds of devices can be used to receive plural forms of communication services all at once by using information media according to respective devices. For example, instant messaging or presence information may be able to be provided at the same time as voice call or video conferencing. Such a unification of communication services or a unified communication service is called unified communication (UC).

The unified communication is realized by using a user interface that unifies two or more kinds of communication services. It is common to provide such a user interface by executing a predetermined application program (which may be called an "application" or an "app" in this application).

For example, in Japanese Translation of PCT International Application Publication No. 2012-502532, a user interface for displaying various function buttons, a presence status icon of each user, images of the user as a communication partner, and the like on an apparatus connected to a network to make it possible to send and receive text data, image data, and voice data is described.

SUMMARY OF THE INVENTION

On the other hand, since multiple processes can be executed at the same time in the unified communication, significantly increased power consumption tends to occur temporarily. When any one of plural stages of power control modes is automatically selected according to the operating state, a power control mode high in power consumption tends to be selected during use of the unified communication. Therefore, the amount of heat generation and the output of a cooling fan may increase more than necessary.

The present invention has been made to solve the above problem, and an information processing apparatus according to the first aspect of the present invention includes: a processor which can take plural power control modes different in rated power from one another; a fan which rotates to dissipate heat generated by the processor; and a power control unit which controls power consumption of the processor, wherein the plural power control modes include two or more stages of dynamic control modes different in rated power from one another and a unified communication mode, the power control unit selects any one of the dynamic control modes based on an event in which a power consumption state of the processor continues for a predetermined duration or more, and when unified communication works, the power control unit preferentially selects the unified communication mode.

The above information processing apparatus may be such that when the launch of a unified communication application program is instructed, the power control unit selects the unified communication mode, and when the end of operation of the unified communication application program is instructed, the power control unit selects any one of the dynamic control modes.

The above information processing apparatus may also include an operation unit which accepts an operation; and a display unit which displays a screen, wherein in a case where the processor executes operation based on the unified communication application program and operation based on any other application program, when a screen display based on the unified communication application program is selected with the operation, the power control unit selects the unified communication mode, while when a screen display based on the other application program is selected with the operation, the power control unit selects any one of the dynamic control modes.

In the above information processing apparatus, a short-term power limit of the unified communication mode may be lower than short-term power limits of all of the dynamic control modes.

In the above information processing apparatus, the rated power of the unified communication mode may also be higher than a minimum value of the rated power of any of the dynamic control modes.

Further, in the above information processing apparatus, while a dynamic control mode higher in rated power than the unified communication mode is being selected, when a transition to the unified communication mode is made, the power control unit may spend a certain amount of time to change rated power consecutively from the rated power before the transition to the unified communication mode up to predetermined rated power of the unified communication mode.

The above information processing apparatus may further include a temperature control unit which controls temperature of the own apparatus using the fan, wherein output of the fan in the unified communication mode is equal to or less than a minimum value of output of the fan in any of the dynamic control modes.

A control method according to the second aspect of the present invention is a control method for an information processing apparatus including: a processor which can take plural power control modes different in rated power from one another; a fan which rotates to dissipate heat generated by the processor; and a power control unit which controls power consumption of the processor, wherein the plural power control modes include two or more stages of dynamic control modes different in rated power from one another and a unified communication mode, the control method including: a step of causing the information processing apparatus to select any one of the dynamic control modes based on an event in which a power consumption state of the processor continues for a predetermined duration or more; and a step of causing the information processing apparatus to preferentially select the unified communication mode when unified communication works.

The above-described aspects of the present invention can execute unified communication more comfortably.

BRIEF DESCRIPTION OF THE DRAWINGS

FIG. 5 is a diagram illustrating an example of a power control table according to the present embodiment.

FIG. 6 is a diagram illustrating an example of a mode transition table according to the present embodiment.

FIG. 7 is a flowchart illustrating an example of mode transition processing according to the present embodiment.

FIG. 8 is an explanatory diagram illustrating a control example of power control modes according to the present embodiment.

FIG. 9 is a diagram illustrating an example of an application table according to the present embodiment.

DETAILED DESCRIPTION OF THE INVENTION

An embodiment of the present invention will be described below with reference to the accompanying drawings. First, the outline of an information processing apparatus 1 according to the embodiment of the present invention will be described. In the following description, a case where the information processing apparatus 1 is a laptop PC is mainly taken as an example. However, the information processing apparatus 1 is not necessarily limited to the laptop PC, and the information processing apparatus 1 may also be a desktop PC, a tablet terminal device, a smartphone, or the like. Further, in the information processing apparatus 1, either or both of an ODD (Optical Disk Drive) 17 and an HDD (Hard Disk Drive) 19 may be omitted.

Figure 1:
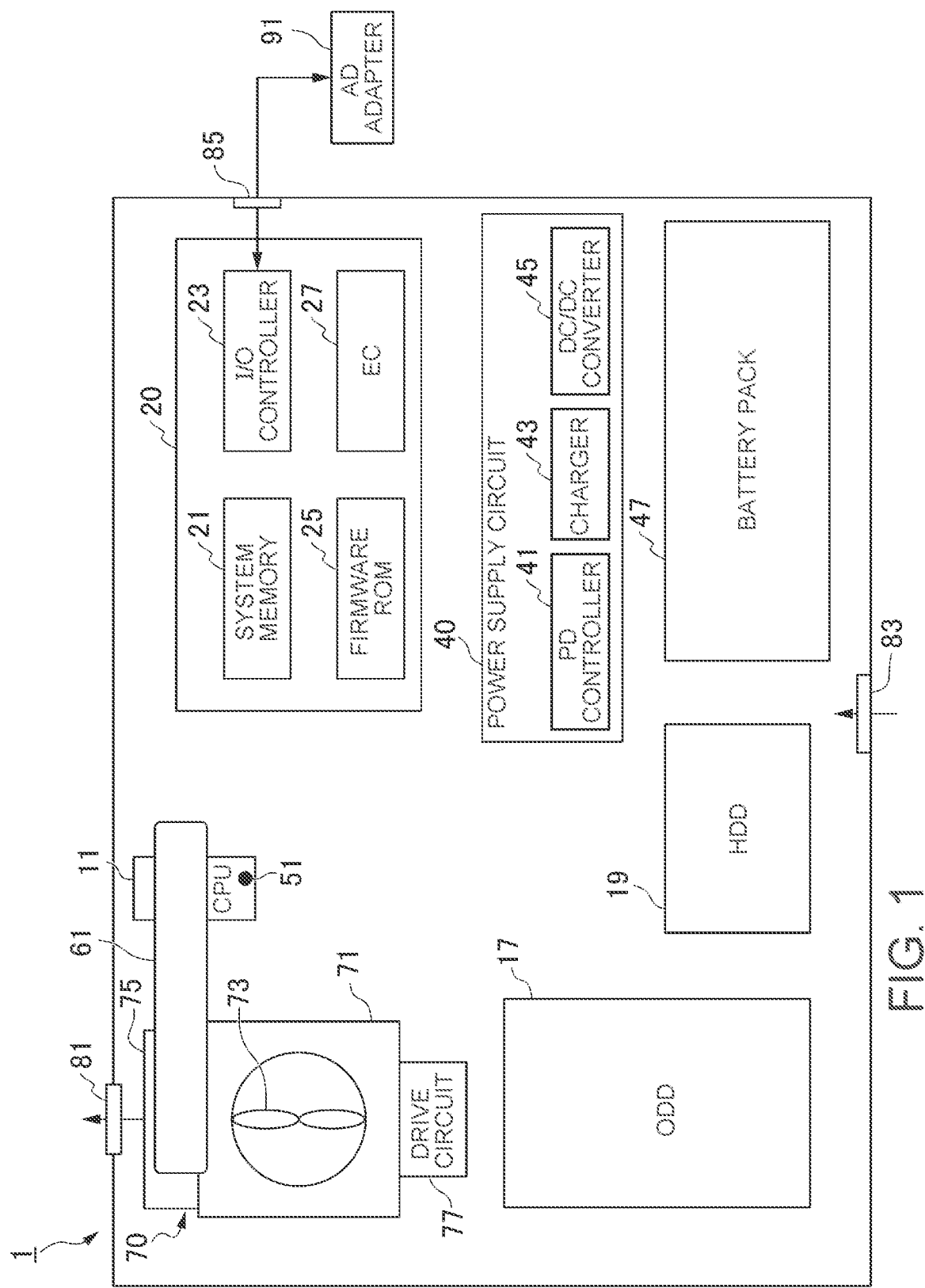
FIG. 1 is a plan view illustrating a hardware configuration example of an information processing apparatus according to an embodiment.

FIG. 1 is a plan view illustrating a hardware configuration example of the information processing apparatus 1 according to the present embodiment.

The information processing apparatus 1 is configured to include a heat dissipation unit 70, a CPU (Central Processing Unit) 11, the ODD 17, the HDD 19, a circuit board 20, a power supply circuit 40, and a battery pack 47, and each of these units is arranged inside a chassis.

On the circuit board 20, a system memory 21, an I/O (Input/output) controller 23, a firmware ROM (Read Only Memory) 25, and an EC (Embedded Controller) 27 are placed.

The system memory 21 is a storage medium used as reading areas of execution programs of the CPU 11 or working areas to which processing data of the execution programs of the CPU 11 are written. The system memory 21 may also be called a main storage device, a main memory, or the like. For example, the system memory 21 is configured to include one or more DRAM (Dynamic Random Access Memory) chips. The execution programs include an OS (Operating System), various drivers for operating peripheral devices, application programs for executing specific processing, and the like. The system memory 21 may also be shared with any other device in addition to being used by the CPU 11 (UMA: Unified Memory Architecture). Here, a common area may be provided in part of the storage area of the system memory 21.

The I/O controller 23 is connected to a data bus to control input/output between respective components of the information processing apparatus 1 and from/to external devices. The I/O controller 23 is configured to include I/O interfaces, such as SATA (Serial Advanced Technology Attachment), USB (Universal Serial Bus), PCI (Peripheral Component Interconnect) Express, and LPC (Low Pin Count), and a RTC (Real Time Clock).

For example, the I/O controller 23 includes a USB interface compliant with the USB 3.2 standard (also called USB Type-C). The USB interface makes it connectable to an external device (for example, an AD (Alternating current-Direct current conversion) adapter 91) to be able to receive the supply of power from the connected external device. In other words, the USB interface can not only perform data input/output with the external device through a signal line of the USB, but also can receive the supply of power through a power line of the USB.

In the firmware ROM 25, various system firmware such as an I/O module and an authentication module is prestored. For example, the I/O module includes a BIOS (Basic Input/output System). When the supply of power is started, the CPU 11 reads the system firmware. The CPU 11 executes processing instructed by a command written in the system firmware. In the following description, the expression that "executes processing instructed by a command written in a program (in addition to the system firmware, an application, the OS, or the like can be regarded as the program)" may also be called "executes a program." Further, in this application, the fact that hardware including a processor such as the CPU 11 performs processing instructed by a command written in a program may also be expressed as "the program performs the processing." For example, the CPU 11 controls input/output of a system device (to be described later) by executing processing instructed by a command written in the BIOS. This may also be expressed as the "BIOS controls input/output of the system device."

The EC 27 is a microcomputer configured to include hardware, such as a CPU, a ROM, and a RAM (Random Access Memory), separately from a processor such as the CPU 11. The EC 27 controls the operation of the power supply circuit 40 according to the operating state of a main system 100 (to be described later) to control the supply of power to each of devices that constitute the information processing apparatus 1. In the present embodiment, the EC 27 controls an input voltage of power to be supplied from the AD adapter 91 to a DC/DC converter 45 of the power supply circuit 40 according to the operating state of the main system 100. The system device means a device that constitutes part of the main system 100, which does not include a device that constitutes part of the EC 27 or a power supply system 300.

The power supply circuit 40 is configured to include a PD (Power Delivery) controller 41, a charger 43, and the DC (Direct Current)/DC converter 45.

The PD controller 41 controls power to be supplied from the AD adapter 91 to the DC/DC converter 45.

The charger 43 controls charging of power supplied from the AD adapter 91 to the battery pack 47. Note that the power supplied from the AD adapter 91 is supplied to the DC/DC converter 45. Out of the supplied power, power remaining without being consumed is charged to the battery pack 47.

The DC/DC converter 45 is a voltage converter which converts the input voltage of DC power supplied from the AD adapter 91, and supplies power of a predetermined voltage, obtained by converting the input voltage, to each device of the information processing apparatus 1.

The battery pack 47 charges power remaining without being consumed out of the power supplied from the charger 43. For example, the battery pack 47 is configured to include a lithium ion battery. When no power is supplied from the AD adapter 91, the battery pack 47 discharges the charged power and supplies the discharged power to the DC/DC converter 45. The battery pack 47 may be fixedly attached to the information processing apparatus 1, or may be detachable.

The AD adapter 91 has one end electrically connected to an outlet of the commercial power supply, and the other end electrically connected via a connector 85 of the information processing apparatus 1.

The AD adapter 91 converts AC power supplied from the commercial power supply into DC power. The AD adapter 91 supplies the converted DC power to the DC/DC converter 45 and the charger 43 via the connector 85.

In the example illustrated in FIG. 1, the AD adapter 91 is separate from the information processing apparatus 1, but the present invention is not limited to this example. The AD adapter 91 may be incorporated and integrated into the chassis of the information processing apparatus 1.

The heat dissipation unit 70 is configured to include a cooling fan 73, a heatsink 75, and a drive circuit 77. The cooling fan 73 is housed in a thin fan chamber 71. The cooling fan 73 is a centrifugal cooling fan having a rotating shaft, a fan motor that rotates the rotating shaft, and plural blades. Each of the plural blades is attached to the rotating shaft, respectively. The heatsink 75 exchanges heat with outside air to exhaust the heat conducted in the own unit to the outside air. The heatsink 75 is placed in a position in which a side opening of the fan chamber 71 is in contact with an exhaust port 81 of the chassis. When the cooling fan 73 is rotated, outside air flows from an air intake port 83 into a suction port of the fan chamber 71, passes through plural fins formed in the heatsink 75 while absorbing heat radiated from the fins, and is exhausted from the exhaust port 81.

A heat pipe 61 is placed in contact with the heatsink 75 in a manner to be thermally bonded to a heat-receiving plate of the CPU 11.

In the information processing apparatus 1, a temperature sensor 51 is installed. The temperature sensor 51 detects the temperature of the own unit, and outputs temperature data indicative of the detected temperature to the EC 27. In the example illustrated in FIG. 1, the temperature sensor 51 is placed in a position in contact with or in proximity to the surface of the CPU 11. In addition, plural other temperature sensors may also be installed for devices the temperature control of which is required, areas to be frequently contacted by a human body, and other members in such a manner that respectively detected temperatures are used for temperature control.

The CPU 11 executes various arithmetic processing by program control to control the overall operation of the information processing apparatus 1. Note that the number of CPUs 11 is not limited to one, and two or more CPUs may also be provided.

Although power of a constant voltage is supplied to the CPU 11 from the DC/DC converter 45, power consumption is generally variable. The CPU 11 may make either or both of the operating voltage and the operating frequency variable depending on the power consumption, respectively. For example, the CPU 11 executes the system firmware to set, in a register included in the CPU 11, the maximum operating frequency allowed according to the operating state (operating mode) of the main system 100 or the power control mode. When the operating frequency at the time is higher than the set maximum operating frequency, the CPU 11 changes the operating frequency step by step to make the operating frequency equal to or less than the set maximum operating frequency. When lowering the operating frequency, the CPU 11 may lower the operating voltage up to a value required for the operation of the own unit with the operating frequency (Speed Step). Thus, the power consumption of the CPU 11 is reduced. In other words, the CPU 11 can increase the allowed maximum power consumption by increasing either of the operating voltage and the operating frequency (for example, the operating frequency), or both of them.

Further, the CPU 11 may perform intermittent operation in which the start and stop of the operation is repeated at regular intervals to make the average processing speed variable (Throttling). The system firmware may make throttling setting information indicative of the validity of throttling and a duty ratio (throttling rate) settable in the register of the CPU 11. The processing power of the CPU 11 can be changed step by step depending also on the throttling. This change in processing power leads to a change in power consumption, and hence a change in the amount of heat generation.

The CPU 11 may use both the speed step and the throttling in such a manner as to execute the throttling while keeping the lowest operating frequency by the speed step. In other words, the CPU 11 can set the maximum power consumption allowed according to the determined operating frequency.

The CPU 11 performs throttling to change the processing power of the own unit to any one of plural stages. The CPU 11 can increase power consumption as the throttling rate increases.

In the following description, the processing power of the CPU 11 or the stage thereof, which can be set variable by either or both of the speed step and the throttling, is called "performance step." It is meant that the larger the value of the performance step, the higher the processing power. Then, the higher the processing power, the higher the power consumption. For example, 100% of the value of the performance step means an operating state in which the processing power is maximized without being reduced.

The CPU 11 may also include a TCC (Thermal Control Circuit). For example, the TCC monitors temperature detected by the temperature sensor 51 to control the operation of the CPU 11 in such a manner that, when the load increases to cause the detected temperature to rise higher than a predetermined reference temperature, the operating frequency and the operating voltage are lowered or intermittent operation is performed to suppress the temperature rise.

Since the CPU 11 is generally high in performance step and the power consumption thereof increases as the usage rate increases, the amount of heat generation increases. By setting a performance step corresponding to power consumption equal to or less than the allowed maximum power consumption, the CPU 11 operates in such a manner that the power consumption becomes equal to or less than the set maximum power consumption. Therefore, the more the performance step is reduced, the longer the execution time of each process becomes, and hence the power consumption is reduced. Heat generated by the CPU 11 not only raises the temperature of the own unit, but also raises temperatures inside and outside of the chassis. However, the lower the power consumption, the smaller the amount of heat generation. Therefore, when the power consumption is low, the stop of a heat dissipation mechanism such as the cooling fan 73 or lowering of output is allowed. In other words, when the power consumption is high, the operation of the cooling fan 73 or increased output is required.

Figure 2:
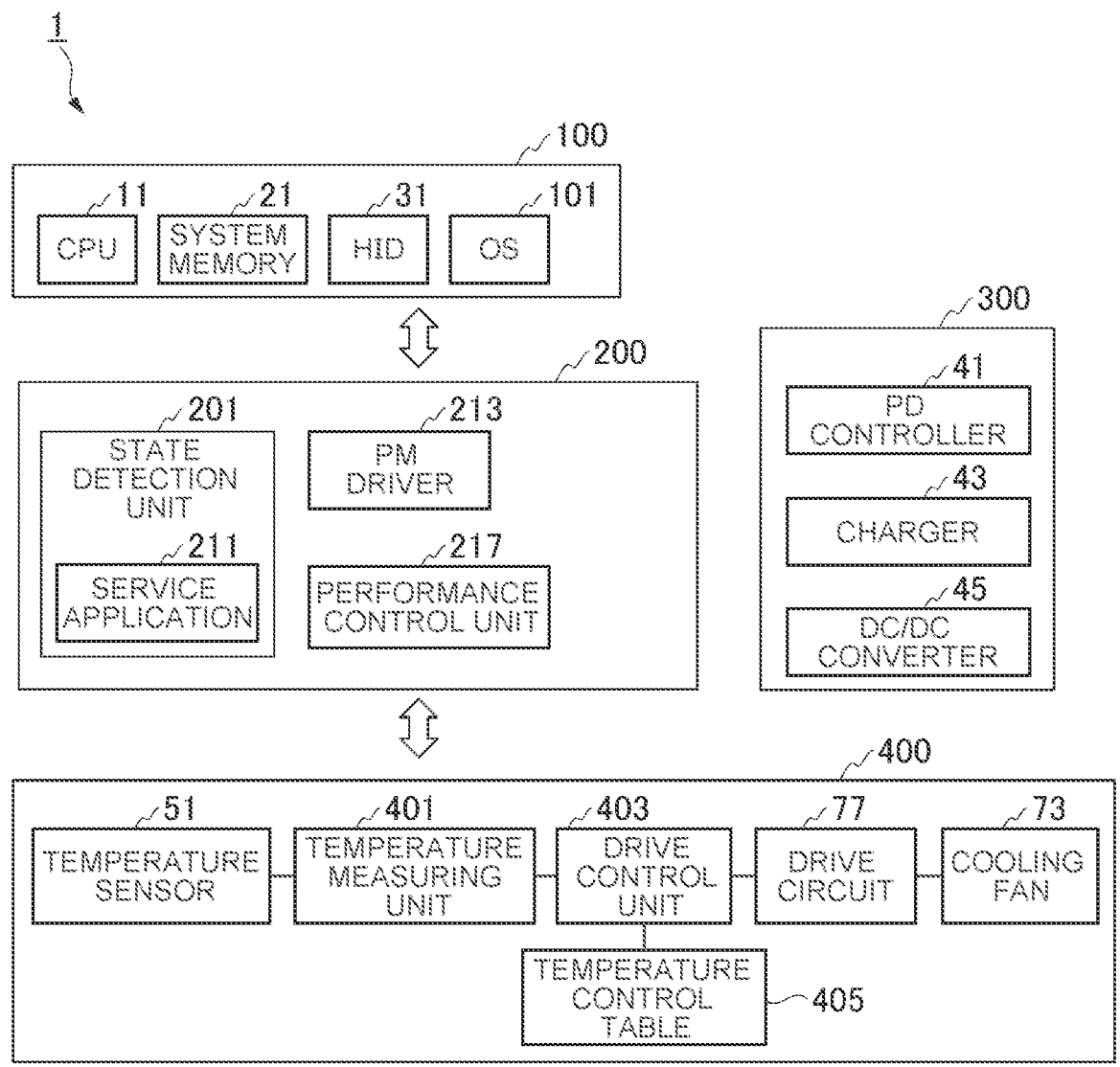
FIG. 2 is a block diagram illustrating a functional configuration example of the information processing apparatus according to the present embodiment.

Next, the functional configuration of the information processing apparatus 1 according to the present embodiment will be described. FIG. 2 is a block diagram illustrating a functional configuration example of the information processing apparatus 1 according to the present embodiment.

The information processing apparatus 1 includes the main system 100, a performance control system 200, the power supply system 300, and a temperature control system 400.

The main system 100 is a computer system configured to include hardware, such as the CPU 11, the system memory 21, and an HID (Human Interface Device) 31, and software such as an OS 101 and a schedule task.

The CPU 11 executes the OS 101 and other software to demonstrate functions instructed by the software in collaboration with hardware such as the system memory 21, the HID 31, and the like. The other software can include a UC (Unified communication) application, and other applications.

The HID 31 is configured to include input devices physically accessed with user's operations to make entries, such as a keyboard, a mouse, and a touch screen, and output devices for presenting information to the user such as a display and a speaker. The input devices provide, to other functional units, various information instructed by the accepted operations. In other words, the HID 31 has a function as an operation unit to accept user's operations. The HID 31 may also be configured to include a speech recognition engine that performs speech recognition processing on user voice to generate speech text indicative of a speech content. Information instructed with an operation or by the speech text may be a command to the main system 100. A display as an output device displays various display information input from the CPU 11 or any other element. The display information corresponds to an execution screen acquired by running an application, a setting screen for setting various setting information (such as parameters), and the like. In other words, the HID 31 has a function as a display unit for displaying a screen based on the execution of each application.

The OS 101 is executed to provide basic functions. The basic functions include, for example, control of the execution state of an app or any other program, providing of a standard interface during the execution of the program, the management of various resources of the main system 100 and other hardware connected to the main system 100 directly or indirectly, and the like.

The CPU 11 executes the OS 101 in collaboration with the system memory 21 or any other hardware to provide, for example, the functions of an application execution control unit, a storage unit, and the like.

The application execution control unit controls the launch (start of execution) of the application, the stop of execution of the application, or the like according to a command input from the HID 31. When the input command is an application launch command indicative of the launch of the application, the application execution control unit instructs the CPU 11 to start the execution of the instructed application on the OS 101. More specifically, the application execution control unit instructs the OS 101 to generate a process for running the instructed application in order to start the execution of the application. When launch complete information indicative of the completion of the launch of the application is input from the OS 101 as a return value, the application execution control unit generates launched application information indicative of the launched application, and stores the generated launched application information in a storage unit 120.

When the input command is an application close command indicative of the end of the execution of the application, the application execution control unit instructs the CPU 11 to end the execution of the instructed application on the OS 101. More specifically, the application execution control unit gives an instruction to end the process of the application, the execution of which is to be ended, in order to end the execution of the application. When execution end information indicative of the end of the execution of the application is input from the OS 101 as a return value, the application execution control unit updates launched application information on the application, stored in the storage unit, to launched application information indicative of the end of the execution of the application.

Therefore, the performance control system 200 can refer to the launched application information stored in the storage unit to identify an application launched by the application execution control unit or an application the operation of which is ended.

Next, a configuration example of the performance control system 200 will be described. The performance control system 200 is configured to include a state detection unit 201, a PM (Power Management) driver 213, and a performance control unit 217. The state detection unit 201 cooperates with a service application 211 executed by the CPU 11 on the OS 101 and an intermediate driver built in the kernel of the OS 101 to demonstrate its function in order to acquire the states of processors including the CPU 11. The intermediate driver monitors processes generated in the CPU 11 by the operation of the OS 101.

The service application 211 is a state monitoring program executed by the CPU 11 to mainly monitor the state of the CPU 11, which provides part of the functionality of the state detection unit 201. For example, the service application 211 acquires, from the OS 101, information on the power consumption of the CPU 11.

The service application 211 may also acquire parameters, such as the average usage rate of the CPU 11 during a predetermined monitoring time to that point, the presence or absence of user activity, and the disk access time, to identify the operating state using the acquired parameters. For example, the service application 211 may recognize the start and end of the execution of a task such as an application program based on the usage rate of the CPU 11, the power consumption parameter, and the like.

The service application 211 outputs, to the PM driver 213, processor state information indicative of the detected state of the processor such as the CPU 11. Note that the service application 211 can refer to the launched application information every predetermined time (for example, every 0.1 to 1.0 seconds) to identify a launched application and an application the operation of which is ended. The launched application information indicative of the launch of the application and the end of the operation of the application can be an element of the processor state information indicative of the state of the processor.

The PM driver 213 extracts a parameter indicative of the state of the processor related to power consumption from various parameters that constitute the processor state information input from the service application 211. The PM driver 213 outputs the processor state information including the extracted parameter to the performance control unit 217 and the PD controller 41. It is common that the required computational amount can differ greatly depending on the application. Therefore, the launched application information can become a parameter indicative of the state related to power consumption.

The performance control unit 217 controls the processing power of the CPU 11 based on the processor state information input from the PM driver 213 or setting information set by using a user interface. In other words, the performance control unit 217 functions as a power control unit to control the power consumption of the CPU 11. For example, the performance control unit 217 constitutes part of the functions obtained by the CPU 11 executing the system firmware.

Note that the maximum power consumption as a parameter related to control of the processing power of the processor includes a first power limit (hereinafter PL1) and a second power limit (hereinafter PL2). PL1 corresponds to rated power. PL1 is a threshold value for allowing power consumption to temporarily exceed this value but restricting the power consumption not to exceed this value continuously for a predetermined time or more. PL1 is also called a long-term power limit. PL2 is a threshold value for restricting the power consumption not to exceed this value even when the power consumption is temporary. PL2 is also called a short-term power limit. PL2 corresponds to the upper limit of the power consumption of the processor when the performance step is 100%. PL1 and PL2 are set for individual processors, respectively. In the following description, PL1 and PL2 related to the CPU 11 are called PL111 and PL112, respectively.

When a period of time during which the power consumption of the processor exceeds PL1 continues a predetermined duration τ (for example, 0.2 to 1 [s]) or more, the performance control unit 217 reduces the performance step set in the register of the processor at the time until the moving average value of the power consumption becomes PL1 or less. Further, the performance control unit 217 increases the performance step set in the register of the processor at the time within such a range that the moving average value of the power consumption does not exceed PL1.

The performance control unit 217 may make PL1 variable between preset upper limit and lower limit of PL1 according to the changing trend of the power consumption of the processor. For example, when the difference between PL1 set at the time and the moving average value of the power consumption is equal to or less than a predetermined difference threshold value, the performance control unit 217 increases PL1. On the other hand, when the difference between the moving average value of the power consumption and PL1 set at the time is larger than the predetermined difference threshold value, the performance control unit 217 reduces PL1.

The performance control unit 217 controls the power consumption of the CPU 11 by the above method using a parameter set instructed in any one of predetermined plural power control modes. Each of parameter sets of individual power control modes includes the upper limit and lower limit of PL1, and PL2. In other words, the CPU 11 can take plural power control modes different in rated power from one another. Therefore, in the register of the CPU 11 or the system memory 21, a power control table is prestored. The power control table is configured to include a parameter set for each of the plural power control modes, respectively.

The plural power control modes include N stages (N is an integer of 2 or more) of dynamic control modes (which may be referred to as "DC mode" in this application) and a unified communication mode (which may be referred to as "UC mode" in this application). In the performance control unit 217, power control mode selection information may be preset. The power control mode selection information is information indicative of each power control selection mode as a method of selecting one power control mode from among the plural power control modes. As power control selection modes, there are a method of identifying any one stage of the N-stage dynamic control modes (for example, a low noise mode (to be described later), which is collectively called a "specific power control mode," according to the user's operation, and a method of selecting any one stage in principle from the N-stage dynamic control modes according to the state of the CPU 11 (which may be called an "auto mode" in this application). The method of selecting any one stage of the dynamic control mode in the auto mode will be described later.

The parameter set related to each individual power control mode includes a range of PL1 (PL111 in FIG. 5). The range of PL1 is represented by the lower limit and the upper limit. The range of PL1 of a DC mode at the n+1 stage (where n is an integer of 1 or more, and equal to or less than N−1) among the N-stage DC modes has only to be a range indicative of values larger than those in the range of PL1 of a power control mode at the n-th stage as a whole. Further, the range of PL1 of a DC mode at the n+1-th stage may be a range wider than the range of PL1 of the n-stage DC mode. PL2 has only to be a value equal to or less than the upper limit of the power consumption on the specifications of the processor. Here, the stages n of the DC modes have only to be set in ascending order of PL1. Further, PL2 may be a value common among the DC modes, or may be independent values.

As PL1 related to the UC mode, a value larger than PL1 of the first stage DC mode may be set. PL1 of the first stage DC mode corresponds to the minimum value among PL1 values of the N stage DC modes. Since computational resources required to execute a UC application are continuously secured, a delay in processing is suppressed. However, it is desired that PL1 related to the UC mode should not be an excessive value. For example, PL1 related to the UC mode may be set to a value equal to or less than PL1 of the second-stage DC mode. On the other hand, PL2 related to the UC mode may be set to a value smaller than PL2 in the N-stages of DC modes. Since the temporary increased power consumption due to the execution of the UC application is suppressed, heat generation and hence the operation of the cooling fan 73 are suppressed.

When the auto mode is set, the performance control unit 217 selects one DC mode from the N stage DC modes according to the changing trend of the state of the CPU 11. When an excess period as a period during which the power consumption of the CPU 11 continues to exceed a first reference power (hereinafter "SP11") becomes a predetermined first period (hereinafter "T11," for example, 5 to 10 seconds) or more, the performance control unit 217 changes the DC mode of the CPU 11 at the time from any stage of not less than the first stage and not more than the n-th stage to the n+1-th stage. SP11 has only to be a value lower, by a predetermined determination width (for example, 0.3 to 1 [W]), than the lower limit of PL111 related to the power control mode of the CPU 11 at the n-th stage at the time.

When an intra-reference period as a period during which the power consumption of the CPU 11 continues to be equal to or less than a second reference power (hereinafter "SP12") becomes a predetermined second period (hereinafter "T12," for example, 5 to 30 seconds) or more, the performance control unit 217 changes the DC mode at the time from any stage of not less than the n+1 stage and not more than the N-th stage to the n-th stage. SP12 has only to be a value lower, by the predetermined determination width (for example, 0.3 to 1 [W]), than the lower limit of PL111 related to the DC mode at the n+1-th stage at the time. SP2 related to the DC mode at the n+1-th stage may be equal to SP11 related to the DC mode at the n+1-th stage, or may be smaller than SP11 at the n+1-th stage. Further, SP12 related to the DC mode at the n+1-th stage has only to be a value larger than SP12 related to the DC mode at the n-th stage. Further, T12 may be equal to T11 or longer than T11. Setting SP12 smaller or setting T11 longer makes it more difficult to change the DC mode to a lower stage rather than to change the DC mode to a higher stage, that is, to a DC mode with higher PL111. This can prepare for an unexpected increase in power consumption.

However, when the UC works, the performance control unit 217 gives priority to the UC mode over the N-stage DC modes. Here, the fact that the UC works means the UC is working effectively, that is, the UC is in an active state. When a newly launched application indicated by the processor state information input from the PM driver 213 is the UC application, the performance control unit 217 can determine that the UC starts working. For example, the performance control unit 217 can refer to an application table indicative of the type of each individual application to identify whether the type of the newly launched application is the UC application or not. The application table is prestored in the register of the CPU 11 or the system memory 21.

FIG. 9 is a diagram illustrating an example of the application table. The application table illustrated in FIG. 9 lists the types of applications for respective application names. For example, when the launch of an application "App01.app" that is not running is notified by the processor state information, the performance control unit 217 can use the application table illustrated in FIG. 9 to determine the working of the UC. In this case, the performance control unit 217 can determine that the power control mode of the CPU 11 is the UC mode.

On the other hand, when the operation of the UC is ended, the performance control unit 217 deselects the UC mode and selects a DC mode at any one of the N stages of DC modes as mentioned above. When the application indicated by the processor state information input from the PM driver 213 that the operation thereof is ended is the UC application, the performance control unit 217 can determine that the operation of the UC is ended. The performance control unit 217 can refer to the application table to identify whether the type of the application the operation of which is ended is the UC application or not. For example, when it is notified by the processor state information that the operation of a running application "App02.app" is stopped, the performance control unit 217 can use the application table illustrated in FIG. 9 to determine that the operation of the UC is stopped.

The performance control unit 217 performs control in such a manner that the power consumption of the CPU 11 does not exceed a value of PL1 in the power control mode set for the CPU 11 at the time and does not exceed PL2 for a predetermined period of time or more. Then, PL2 may be a value equal to or more than the largest value of PL1 for each of DC modes that the CPU 11 can take, or may be a value common among the DC modes. Thus, even when PL1 related to the DC mode of the processor at the time is low, since PL2 equivalent to a DC mode with higher PL1 is set, a temporary rise of power consumption is allowed. Therefore, the performance of the CPU 11 can be temporarily demonstrated without changing the DC mode as long as the power consumption is continuously low.

In the following description, conditions for changing to the DC mode at the n+1-th stage with PL1 higher than the DC mode set at the time may be called upgrading conditions (rank up conditions). Parameters related to the upgrading conditions, that is, SP11 and T11 for the CPU 11 may be called upgrading parameters. Further, conditions for changing to the DC mode at the n-th stage with lower PL1 may be called downgrading conditions (rank down conditions). Parameters related to the downgrading conditions, that is, SP12 and T12 for the CPU 11 may be called downgrading parameters. Further, the upgrading conditions and the downgrading conditions may be collectively referred to as power-mode transition conditions or simply as mode transition conditions. Further, the upgrading parameters and the downgrading parameters may be collectively referred to as power-mode transition parameters or simply as mode transition parameters.

Therefore, in the register of the CPU 11 or the system memory 21, a mode transition table may be prestored separately from the power control table. The mode transition table is configured to include information indicative of the mode transition conditions or the mode transition parameters for each power control mode after being changed. More specifically, for the CPU 11, SP1, T11, SP2, and T12 may be included in the mode transition table. However, for the DC mode at the first stage with the lowest rated power PL1, SP2 and T12 may not be set. For the DC mode at the N-th stage with the highest PL1, SP1 and T11 may not be set.

The performance control unit 217 refers to the mode transition table to identify mode transition conditions that the state of the CPU 11 satisfies in order to change to a DC mode corresponding to the identified mode transition conditions. Note that when there are no mode transition conditions that the state of the CPU 11 at the time satisfies in the mode transition table (floating state (float)), the performance control unit 217 may maintain the power control mode of the CPU 11 at the time without making any change. An example of changes of power control modes will be described later.

Note that the performance control unit 217 refers to the power control table to identify a range of PL1 and PL2 related to the power control mode at the time. The performance control unit 217 uses the identified range of PL1 and PL2 to determine the performance step mentioned above. The performance control unit 217 outputs, to the drive control unit 403, power control mode information indicative of the determined power control mode. An example of power control modes will be described later.

Note that the performance control unit 217 may further use the temperature of the CPU 11 input from a temperature measuring unit 401 (to be described later) to control the processing power of the CPU 11. For example, in the register of the CPU 11, a control table indicative of a performance step for each set of temperature and power consumption is preset. The performance control unit 217 identifies a performance step corresponding to the temperature input for the CPU 11 and the power consumption indicated by the acquired processor state information. The performance control unit 217 sets the identified performance step in the register of the CPU 11.

Next, a configuration example of the power supply system 300 will be described. The power supply system 300 is configured to include the PD controller 41, the charger 43, and the DC/DC converter 45.

The PD controller 41 controls power supplied to the DC/DC converter 45 based on the processor state information input from the PM driver 213. The PD controller 41 adds consumed power due to the conversion of power by the DC/DC converter 45 or the like to the sum of power as the total value of power consumption required in each device to determine total power, and outputs, to the AD adapter 91, a power request signal indicative of the determined total power. The sum of power includes power consumption of each processor indicated in the operating state information.

The PD controller 41 may detect a charged state of the battery pack 47 (FIG. 1) to control charging from the charger 43 to the battery pack 47 based on the detected charged state. For example, when the electromotive force (battery voltage) of the battery pack 47 is a predetermined full-charge voltage or more, the PD controller 41 outputs, to the charger 43, charge control data indicative of a charge stop to stop charging to the charger 43. On the other hand, when the electromotive force of the battery pack 47 is less than the predetermined full-charge voltage, the PD controller 41 outputs, to the charger 43, charge control data indicative of execution of charging to cause the charger 43 to execute charging. The PD controller 41 may preset charge control data including a set value of the maximum charging current and a set value of the maximum charging voltage to the charger 43 to cause the charger 43 to perform charging with the maximum charging current or less and the maximum charging voltage or less instructed by these set values.

Note that the AD adapter 91 converts AC power, supplied to the own unit, to DC power. The AD adapter 91 supplies, to the information processing apparatus 1, DC power as the total amount of power indicated by the power request signal input from the PD controller 41. The information processing apparatus 1 and the AD adapter 91 are connected through a USB cable capable of transmitting various data, for example, according to the USB 3.2 standard. The USB cable has a signal line and a power line.

The charger 43 controls charging of power, supplied from the AD adapter 91 based on the charge control data input from the PD controller 41, to the battery pack 47. The charger 43 charges, to the battery pack 47, power remaining without being consumed out of the power supplied from the AD adapter 91.

The DC/DC converter 45 converts the voltage of power, supplied from the AD adapter 91, to a predetermined voltage required for the operation of each of devices that constitute the information processing apparatus 1, and supplies, to each device, power having the converted voltage. Note that when no power is supplied from the AD adapter 91, the DC/DC converter 45 converts power, supplied from the battery pack 47, to power as an input voltage, and supplies power of a predetermined voltage to each device.

Next, a configuration example of the temperature control system will be described. The temperature control system 400 is configured to include the temperature sensor 51, the temperature measuring unit 401, the drive control unit 403, a temperature control table 405, the drive circuit 77, and the cooling fan 73. The temperature measuring unit 401, the drive control unit 403, and the temperature control table 405 may be implemented as part of the functions of the EC 27, or may be implemented as part of the functions of the CPU 11.

The temperature sensor 51 outputs, to the temperature measuring unit 401, a temperature signal indicative of a physical quantity (for example, thermo-electromotive force) related to the detected temperature. As mentioned above, the temperature sensor 51 can measure the surface temperature of the CPU 11.

The temperature measuring unit 401 measures temperature corresponding to the physical quantity, indicated by the temperature signal input from the temperature sensor 51 every predetermined time (for example, 0.1 to 5 seconds). The temperature measuring unit 401 outputs, to the drive control unit 403, temperature data indicative of the measured temperature.

The drive control unit 403 determines the operating state of the cooling fan 73 based on the power control mode indicated by the power control mode information input from the performance control unit 217 and the temperature indicated by the temperature data input from the temperature measuring unit 401. The drive control unit 403 refers to the temperature control table 405 to determine an operating amount according to the power control mode and the temperature. The drive control unit 403 generates a drive control signal indicative of the determined operating amount, and outputs the generated drive control signal to the drive circuit 77.

The temperature control table 405 is configured to include, for each power control mode, one or more stages of sets of operating amounts and operating temperatures of the cooling fan 73. The operating temperature is temperature to instruct the cooling fan 73 to start operation in accordance with the operating amount corresponding to the operating temperature when the temperature detected by the temperature sensor 51 is on the rise. When the temperature is on the rise in the power control mode at the time, and exceeds an operating temperature at a certain stage, the drive control unit 403 determines an operating amount corresponding to the operating temperature at the stage. On the other hand, when the temperature is on the drop in the power control mode at the time, and falls below an operating temperature at a certain stage by a predetermined decline (for example, 2 to 3 [° C.]), the drive control unit 403 determines an operating amount corresponding to an operating temperature at a stage one step lower than the operating temperature at the stage. Note that when there is no output corresponding to the operating temperature at the one-step lower stage, that is, when an operating amount at the 0-th stage is determined, the drive control unit 403 determines to stop, and outputs, to the drive circuit 77, a drive control signal indicative of the stop. An example of the temperature control table will be described later.

The drive circuit 77 supplies, to the cooling fan 73, power corresponding to the operating amount indicated by the drive control signal input from the drive control unit 403. The amount of heat generation of the main system 100 depends mainly on the amount of heat generation of the CPU 11 among the electronic devices. The rotational speed of the cooling fan 73 is controlled based on the temperature T and the power control mode to dissipate heat according to the temperature rise due to heat generation.

Next, a data flow in voltage control according to the present embodiment will be described.

Figure 3:
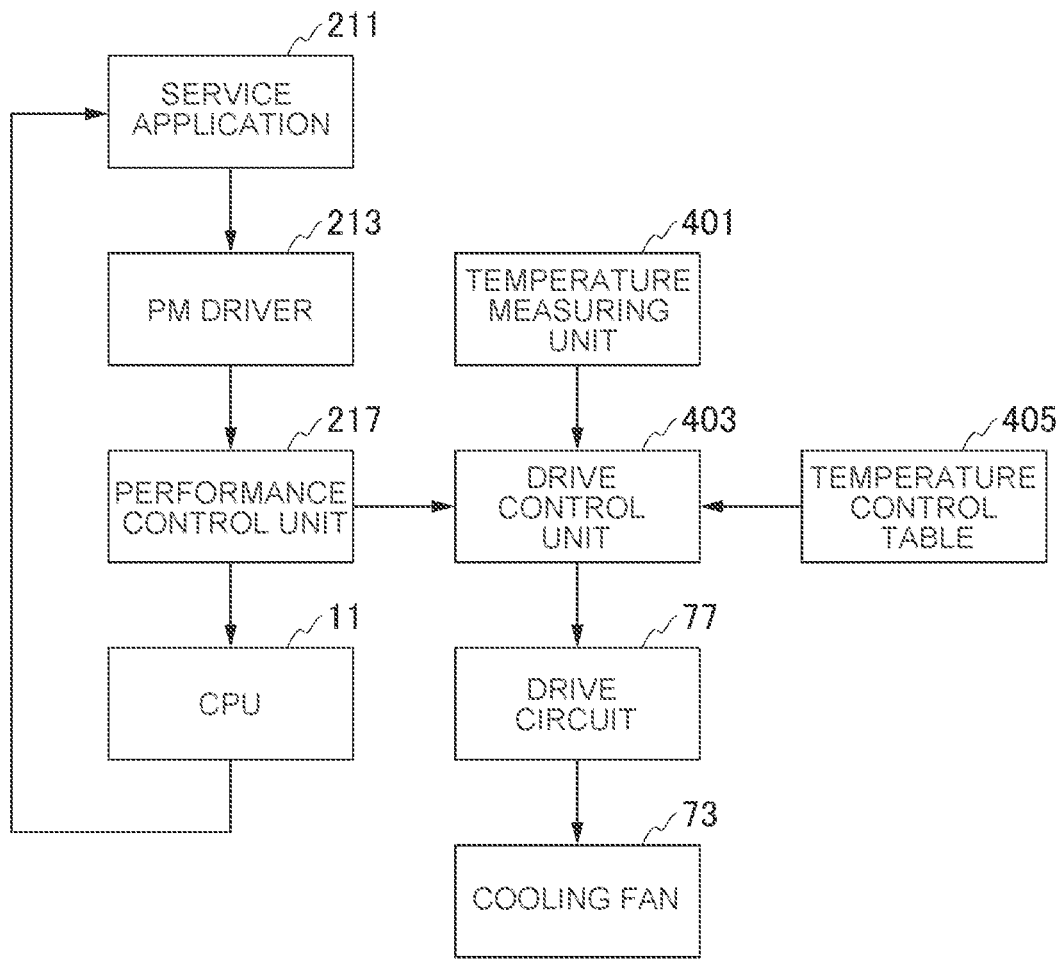
FIG. 3 is a schematic block diagram illustrating an example of a data flow in voltage control according to the present embodiment.

FIG. 3 is a schematic block diagram illustrating an example of the data flow in voltage control according to the present embodiment.

The service application 211 detects the state of the CPU 11, and outputs, to the PM driver 213, processor state information indicative of the detected state.

The PM driver 213 outputs, to the performance control unit 217, the processor state information input from the service application 211. The processor state information includes information related to the power consumption or temperature of the CPU 11. In the processor state information, information on an application launched on the CPU 11 and information on an application the operation of which is ended may also be included.

Based on the processor state information input from the PM driver 213, the performance control unit 217 controls the processing power of the CPU 11.

Here, the performance control unit 217 determines any one of the DC modes to be the power control mode of the CPU 11 according to the changing trend of the power consumption of the CPU 11. However, when the UC application is newly launched, the performance control unit 217 determines the UC mode to be the power mode of the CPU 11. When the operation of the UC application is ended, the performance control unit 217 deselect the UC mode, and changes the power control mode to any one of the DC modes again according to the changing trend of the power consumption of the CPU 11.

The settable range of PL1 and PL2 vary depending on the power control mode. The performance control unit 217 sets, in the register of the CPU 11, the range of PL1 and PL2 determined for the CPU 11. The CPU 11 controls power consumption based on the range of PL1 and PL2 determined by the performance control unit 217.

The performance control unit 217 outputs, to the drive control unit 403, power control mode information indicative of the power control mode determined for the CPU 11.

The temperature measuring unit 401 outputs, to the drive control unit 403, temperature data indicative of temperature detected from the physical quantity indicated by the temperature signal input from the temperature sensor 51.

The drive control unit 403 refers to the preset temperature control table 405 to determine the operating amount of the cooling fan 73 based on the power control mode notified from the performance control unit 217 and the temperature indicated by the temperature data input from the temperature measuring unit 401.

The drive control unit 403 generates a drive control signal indicative of the determined operating amount, and outputs the generated drive control signal to the drive circuit 77.

The drive circuit 77 supplies, to the cooling fan 73, power corresponding to the operating amount indicated by the drive control signal input from the drive control unit 403.

The cooling fan 73 operates while consuming the power supplied from the drive circuit 77.

(Power Control Mode)

Figure 4:
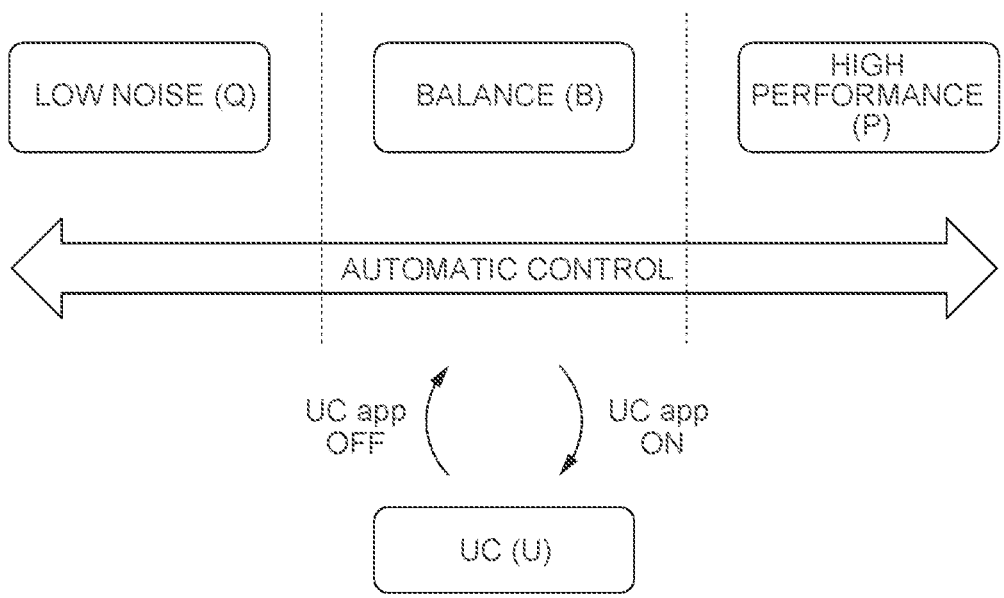
FIG. 4 is an explanatory diagram illustrating an example of power control modes according to the present embodiment.

Next, an example of power control modes according to the present embodiment will be described. FIG. 4 is an explanatory diagram illustrating the example of power control modes according to the present embodiment. Among four-stage power control modes illustrated in FIG. 4, a low noise mode (Q: Quiet), a balance mode (B: Balance), and a high performance mode (P: Performance) all belong to the DC modes. The remaining power control mode is the UC mode (U). Each power control mode is characterized by the surface temperature, the noise level, and the set power.

The present embodiment mainly takes a case where any of three-stage DC modes is automatically selected according to the state of the CPU 11 as mentioned above. However, when the UC application is launched (UC app ON), the UC mode is selected. When the operation of the UC application is ended (UC app OFF), the UC mode is deselected. The UC application is so executed that the UC mode is given priority over the DC modes when the UC works. Therefore, the computational resources required to execute the UC are secured, and excessive power consumption is suppressed. Thus, heat generation due to power consumption and hence noise due to the operation of the cooling fan 73 are suppressed.

FIG. 5 is a diagram illustrating an example of the power control table according to the present embodiment.

The low noise mode (Q) is a power control mode focusing on reduction in noise level caused by the operation of the cooling fan 73. As the noise level parameter, the noise upper limit is kept low as SND1 [dB]. Since the opportunity to make the cooling fan 73 work or the output of the cooling fan 73 is reduced, PL111 is so set that both upper limit PO111$qu$ [W] and lower limit PO111$ql$ [W] as set power parameters are kept lower than PL111 in the other DC modes. Therefore, the low noise mode (Q) is suitable when the processing power is relatively low or when quick response is not required. For example, the low noise mode (Q) is applied to relatively light processing, such as editing or browsing of a document by a document creation app, browsing of a web page by a browser, calling, and sending/receiving emails. Note that PO111$qu$ may also be set to a value equal to PO111$q1$. In this case, the fluctuation of PL111 is not allowed and fixed to a value of PO111$qu$ or PO111$ql$.

The balance mode (B) is a power control mode focusing on the balance between the reduction in noise level and the fluctuation of processing power. The range of PL111 related to the balance mode (B) is so set that the upper limit is PO111$bu$ [W] and the lower limit is PO111$bl$ [W]. This range is in the middle of the range of PL111 related to the low noise mode (Q) and the range of PL111 related to the high performance mode (P). In other words, PO111$pl$≥PO111$bu$>PO111$bl$≥PO111$qu$.

The noise upper limit related to the balance mode (B) is SND2 [dB] in the middle of the noise upper limit SND1 related to the low noise mode (Q) and the noise upper limit SND3 related to the high performance mode (P). Therefore, the balance mode (B) is suitable for processing that does not become excessive even though a moderate state of power consumption continues. For example, the balance mode (B) can be applied to open a large file, install an app, execute a security measures app, and execute a CAD (Computer Aided Design) app.

The high performance mode (P) is a power control mode for making full use of the processing power of the CPU 11. PL111 related to the high performance mode (P) may be such that the lower limit is PO111$p1$ [W], which is equal to or more than PL111 in the other power control modes, and the upper limit is PO111$pu$ [W] which is a value equivalent to PO112 settable in PL112. Therefore, the range of PL111 related to the high performance mode (P) becomes wider than the ranges of PL111 related to the other DC modes.

Since the high performance mode (P) is selected when more processing power is required, noise due to the operation of the cooling fan 73 is allowed. The noise upper limit SND3 [dB] related to the high performance mode (P) is higher than the noise upper limits related to the other power control modes. Therefore, the high performance mode (P) is suitable when the power consumption is continuously high or when quick response is required. For example, the high performance mode (P) can be applied to video editing, large-volume video streaming, AR/VR simulation, and the like.

The UC mode (U) is a power control mode applied during the execution of the UC. PL111 related to the UC mode (U) is so set that the lower limit is PO111$ul$ [W] as a value larger than PO111$ql$ in the low noise mode (Q) and smaller than PO111$bl$ in the balance mode (B). The upper limit PO111$uu$ [W] of PL111 related to the UC mode (U) is set to a value larger than PO111$qu$ in the low noise mode (Q) and smaller than PO111$bu$ in the balance mode (B). Therefore, computational resources required to execute the UC are secured. Even in the UC mode (U), PO111$ul$ may be set equal to PO111$uu$ and PL111 may be set to a fixed value. On the other hand, PO112$u$ related to the UC mode (U) is set to a value smaller than PO112 in the DC modes. Since a temporary rise of power consumption is prevented and hence a fluctuation of allowed power consumption is suppressed, heat generation is suppressed and hence noise due to the operation of the cooling fan is reduced.

In the example illustrated in FIG. 5, target temperatures are indicated as TEM1 [° C.], TEM2 [° C.], TEM3 [° C.], and TEM4 [° C.] in the low noise mode (Q), the balance mode (B), the high performance mode (P), and the UC mode (U), respectively. Here, the target temperatures have only to have the following relations: TEM1=TEM4≤TEM2≤TEM3. These temperatures are temperatures a user can tolerate even in contact with the surface of the chassis while using the information processing apparatus 1. Further, in the example illustrated in FIG. 5, PL112 is all PO112 [W] in the tree-stage DC modes. Thus, a temporary rise of power consumption is allowed in all of the DC modes.

Next, an example of the mode transition table will be described. FIG. 6 is a diagram illustrating an example of the mode transition table according to the present embodiment. The mode transition table illustrated in FIG. 6 is configured to include mode transition conditions for each power control mode, respectively.

In the mode transition table, a transition condition for the setting of the UC mode is allocated to the first line. Then, upgrading conditions are arranged in descending order of PL1 in the power control modes after being changed, that is, arranged in the order of the high performance mode (P), the balance mode (B), and so on. Further, downgrading conditions of the CPU 11 are arranged in ascending order of PL1 in the power control modes after being changed, that is, arranged in the order of the low noise mode (Q), the balance mode (B), and so on. Each order of these mode transition conditions corresponds to the priority of mode transition conditions to be applied by the performance control unit 217 in a manner as will be described later.

In the example illustrated in FIG. 6, the transition condition to the UC mode is the launch of the UC application (UC app=ON). An upgrading condition of the CPU 11 to the high performance mode (P) is that a duration during which the power consumption of the CPU 11 is SP113 or more is T113 or more.

An upgrading condition of the CPU 11 to the balance mode (B) is that a duration during which the power consumption of the CPU 11 is SP112 or more is T112 or more.

A downgrading condition of the CPU 11 to the low noise mode (Q) is that a duration during which the power consumption of the CPU 11 is SP121 or less is T121 or more.

A downgrading condition of the CPU 11 to the balance mode (B) is that a duration during which the power consumption of the CPU 11 is SP122 or less is T122 or more.

As illustrated in FIG. 6, an upgrading condition to a DC mode with higher PL1 tends to be difficult to satisfy unless a high power consumption state of the CPU 11 continues.

Therefore, when the state of the CPU 11 satisfies upgrading conditions to two or more DC modes, the performance control unit 217 identifies an upgrading condition to a DC mode with the highest PL1 among the satisfied upgrading conditions to give priority to the transition to the DC mode related to the identified upgrading condition. This can make a transition immediately to a DC mode with PL1 as high as possible in such a phase that a continuously high power consumption state or the operating state continues.

On the other hand, a downgrading condition to a DC mode with lower PL1 tends to be difficult to satisfy unless a low power consumption state of the CPU 11 continues.

Therefore, when the state of the CPU 11 satisfies downgrading conditions to two or more DC modes, the performance control unit 217 identifies a downgrading condition to a DC mode with the lowest PL1 among the satisfied downgrading conditions to give priority to the transition to the DC mode related to the identified downgrading condition. This can immediately make a transition to a DC mode with PL1 as low as possible in such a phase that a continuously low power consumption state or the stopped state continues. However, in the present embodiment, the transition to the UC mode is given priority over transitions between DC modes, and the UC mode is deselected when the UC is not working.

Referring next to FIG. 7, an example of mode transition processing will be described. FIG. 7 is a flowchart illustrating an example of mode transition processing according to the present embodiment.

(Step S102) The performance control unit 217 refers to the mode transition table to determine whether or not the state of the CPU 11 satisfies each of the mode transition conditions, respectively. When there is a mode transition condition that the state of the CPU 11 satisfies (YES in step S102), the performance control unit 217 proceeds to a process in step S104. On the other hand, when the state of the CPU 11 does not satisfy any of the mode transition conditions (NO in step S102), the performance control unit 217 proceeds to a process in step S106.

(Step S104) The performance control unit 217 identifies the most precedent mode transition condition among the mode transition conditions that the state of the CPU 11 satisfies. The performance control unit 217 changes the power control mode of the CPU 11 to a power control mode related to the identified mode transition condition. After that, the performance control unit 217 returns to the process in step S102.

(Step S106) The performance control unit 217 maintains the power control mode of the CPU 11 at the time. After that, the performance control unit 217 returns to the process in step S102.

FIG. 8 is an explanatory diagram illustrating a control example of power control modes using the mode transition table illustrated in FIG. 6. Halftone dot meshing of mode transition conditions in "STATE" column of FIG. 8 indicates that the state of the CPU 11 satisfies the mode transition condition concerned. In the example illustrated in FIG. 8, since the state of the CPU 11 satisfies the transition condition to the UC mode (U), the upgrading condition to the high performance mode (P), and the upgrading condition to the balance mode (B), the performance control unit 217 changes the power control mode of the CPU 11 to the UC mode (U) to which the highest priority is given among these conditions. Assuming here that the operation of the UC app is stopped, the transition condition to the UC mode (U) is no longer satisfied. In this case, the performance control unit 217 changes to a DC mode as a transition destination to which the highest priority is given among the transition conditions satisfied at the time.

Note that when the state of the CPU 11 does not satisfy any of the mode transition conditions (floating state), the performance control unit 217 maintains the mode transition condition at the time without any change.

In the transition between DC modes, a pair of SP112 and T112, a pair of SP121 and T121, and so on are used to evaluate whether power consumption is continuously high or not. As the state where the power consumption is continuously high continues for a longer time, the performance control unit 217 can make a transition to a higher stage power control mode.

Next, an example of the temperature control table will be described. The temperature control table is configured to include one or more stages of sets of outputs of the cooling fan 73 and operating temperatures for each power control mode. As the stage of the DC mode is higher, the number of stages of the operating amount as the output of the cooling fan 73 has only to be increased. For example, in the low noise mode (Q), the balance mode (B), and the high performance mode (P), the number of stages is one, three, and five stages, respectively. In other words, as the stage of the power control mode is higher, the drive control unit 403 has only to be able to increase the upper limit of the operating amount of the cooling fan 73 and to widen the range of the operating amount. However, the operating amount and the number of stages related to the UC mode (U) may also be equivalent to the operating amount and the number of stages related to the low noise mode (Q). This is because the amount of heat generation in the UC mode (U) is suppressed to the same extent on average as the amount of heat generation in the low noise mode (Q), and hence the operating amount of the cooling fan 73 is also equivalent to each other. Note that the operating amount is not limited to the noise level [dB] caused by the operation of the cooling fan 73 as the output of the cooling fan 73, and the operating amount may be instructed by the rotational speed [rpm: round per minute] of the cooling fan 73 per unit time, or the power consumption [W] of the cooling fan 73.

In the above description, the case where the performance control unit 217 directly uses parameters (that is, PL111, PL112, and the like) related to the power control mode selected from among predetermined plural power control modes is taken as an example, but the present invention is not limited to this case. When a transition from the high performance mode (P) or the balance mode (B) to the UC mode (U) is made, PL111 decreases. Particularly, immediately after the selection of the UC mode (U), since the computational resources are consumed to execute an application at the time, the computational resources required to execute the UC application may not be able to be secured sufficiently. Therefore, upon making a transition to the UC mode (U) when a DC mode with PL111 higher than that in the UC mode (U) is selected, the performance control unit 217 may spend a certain amount of time (for example, 10 seconds to 1 minute) to change PL111 consecutively from PL111 before the transition to the UC mode (U) up to a predetermined value of PL111 in the UC mode (U). In the transition to the UC mode (U), since PL111 for the CPU 11 gradually decreases, the computational resources required to execute the UC application can be secured more reliably. This can start the UC more smoothly.

In the above description, the example in which the performance control unit 217 determines whether the UC is working or not based simply on the presence or absence of the operation of the UC application is taken, but the present invention is not limited to this example. According to the application execution control unit, two or more applications may go into operating states at the same time under a multi-window function. Under the multi-window function, the service application 211 displays windows as screen displays related to running applications, respectively. When displaying two or more windows, the service application 211 determines any one window as an active window. The service application 211 controls the operation of an application related to the active window (hereinafter, foreground application) based on an operation of the HID 31 to indicate within the range of the active window, and does not control the operation of the other applications (hereinafter, background applications) related to the other windows (hereinafter, the inactive windows).

The functions obtained by the CPU 11 executing the OS 101 includes a function to priority displays the active window over the inactive windows. The priority display means only part of the active window is displayed in an overlapping area, in which the active window and an inactive window(s) overlap each other, without displaying the overlapped part of the inactive window(s). The priority display may also include a display of the active window in such a manner as to stand out from the inactive window(s). Therefore, the application execution control unit determines, as the active window, a window related to a newly launched application, and determines a window related to a running application as an inactive window. Further, the application execution control unit determines, as a newly active window, an inactive window instructed with an operation, and determines the active window at the time as an inactive window. Then, the application execution control unit generates launched application information further indicative of a foreground application in addition to running applications, and stores the launched application information in the storage unit 120. The application execution control unit updates the launched application information each time an application is launched, each time the running app is closed, and each time the foreground application is changed.

Therefore, when the foreground application is the UC application, the performance control unit 217 may determine that the UC is working and select the UC mode. On the other hand, when the foreground application is not the UC application, the performance control unit 217 may determine that the UC is not working regardless of whether the UC application is running or not. In this case, the performance control unit 217 may deselect the UC mode and select any one of DC modes.

The service application 211 refers to the launched application information mentioned above to output information, which is indicative of applications running at the time and a foreground application among the running applications, to the performance control unit 217 via the PM driver 213 in a manner of being included in the processor state information. Based on the processor state information input from the service application 211, the performance control unit 217 can determine whether or not the UC application is included in the applications running at the time, and when the UC application is included, the performance control unit 217 can determine whether the UC application corresponds to the foreground application or not.

Thus, even in a case where the UC application is included in plural running applications, when the UC application displays an active window, the UC mode is selected, while when any other application displays an active window, the UC mode is not selected. Therefore, when a user mainly uses the UC, since the CPU 11 works according to the UC mode, heat generation and hence noise caused by the cooling fan 73 are suppressed. When the user mainly uses any other application, the CPU 11 works according to a DC mode corresponding to the execution state of the application. For example, when a CAD app as any other application becomes the foreground application, the throughput of the CAD app tends to be higher than that of the UC application. In this case, since the user is relatively not too interested in the UC, heat generation and noise are allowed. Further, when the high performance mode (P) is selected according to the execution state of the CAD app, the function thereof is not disturbed.

As described above, the information processing apparatus (for example, the information processing apparatus 1) according to the present embodiment includes a processor (for example, the CPU 11) which can take plural power control modes different in rated power from one another, and a power control unit (for example, the performance control unit 217) which controls the power consumption of the processor. The plural power control modes include two or more stages of dynamic control modes (for example, the low noise mode, the balance mode, and the high performance mode) different in rated power from one another, and a unified communication mode (for example, the UC mode). The power control unit selects any one of the dynamic control modes based on an event in which a power consumption state of the processor continues for a predetermined duration or more, and selects the unified communication mode when unified communication works.

According to this configuration, since the unified communication mode is selected when the unified communication works effectively, the power consumption of the processor is controlled according to the unified communication mode. Further, since excessive heat generation accompanied with the selection of a dynamic control mode and noise due to heat dissipation are suppressed, more comfortable unified communication is realized.

Further, the power control unit may select the unified communication mode when the launch of a unified communication application program is instructed, and may select any one of the dynamic control modes when the end of the operation of the unified communication application program is instructed.

According to this configuration, the unified communication mode is selected while the unified communication application program is running. Therefore, the unified communication mode capable of suppressing excessive heat generation and noise due to heat dissipation is selected with priority over the dynamic control modes.

The information processing apparatus according to the present embodiment may also include an operation unit which accepts an operation, and a display unit (for example, the HID 31) which displays a screen. In a case where the processor executes operation based on the unified communication application program and operation based on any other application program, when a screen display based on the unified communication application program is selected according to the operation (for example, when the UC application is a foreground application), the power control unit may select the unified communication mode, while when a screen display based on the other application program is selected according to the operation (for example, when the other application is the foreground application), the power control unit may select any one of the dynamic control modes.

According to this configuration, even during execution of the plural application programs, when the user mainly uses the unified communication, the unified communication mode is selected, while when the user does not mainly use the unified communication, any one of the dynamic control modes is selected. Therefore, power control according to the application program mainly used is done.

The short-term power limit of the unified communication mode may be lower than the short-term power limits of all of the dynamic control modes.

According to this configuration, since a temporary rise of power consumption is suppressed at the runtime of the unified communication, excessive heat generation and hence noise due to heat dissipation can be suppressed.

The rated power of the unified communication mode may be higher than a minimum value of the rated power of any of the dynamic control modes.

According to this configuration, since the computational resources required for the unified communication are secured, the function of the unified communication is not disturbed.

While a dynamic control mode higher in rated power than the unified communication mode is being selected, when a transition to the unified communication mode is made, the power control unit may spend a certain amount of time to change the rated power consecutively from the rated power before the transition to the unified communication mode up to predetermined rated power of the unified communication mode.

According to this configuration, since the rated power gradually decreases in the transition of the power control mode to the unified communication mode, the reduction of computational resources can be mitigated. Since the computational resources can be secured more reliably at the start of the unified communication, the unified communication can be executed reliably.

Further, the information processing apparatus according to the present embodiment may include a temperature control unit (for example, the temperature control system 400) which controls temperature of the own apparatus using the cooling fan 73. The output of the cooling fan 73 in the unified communication mode may be equal to or less than a minimum value of the output of the cooling fan 73 in any of the dynamic control modes.

According to this configuration, the operating amount of the cooling fan 73 can be minimized at the runtime of the unified communication. Therefore, noise due to the operation of the cooling fan 73 is suppressed.

Note that the various parameters related to the above-mentioned processing are not limited to those mentioned above, and the parameters may be changed according to various requirements, such as the processing power of the processor, the number of processors, and the size of the chassis. For example, the number of stages of DC modes, the upper limit and lower limit of PL111 related to each stage, values of PL112, SP112, T112, SP121, T121, and so on, the number of stages of outputs of the cooling fan 73, output at each stage, and the operating temperature may vary. Further, when the values of SP112, SP121, and the like are values determined based on the upper limit of PL1 or the lower limit of PL1, these values may be omitted in the temperature control table. Further, when the values of T11 and T12 are constant values regardless of the DC modes, these values may be omitted in the temperature control table.

Further, when determining the continuation of the state of the CPU 11, the performance control unit 217 may use a representative value representing a changing trend, such as a moving average value up to the time or a median, instead of the instantaneous value as the power consumption of the CPU 11. For example, the moving average value may be an exponentially weighted moving average, or a simple moving average value within a predetermined period (for example, 1 to 20 [s]) up to the time to pay attention (the attention time).

The above-mentioned parameters may be changeable according to an operation signal generated according to an operation accepted by the HID 31. The performance control unit 217 may determine a power control mode according to the operation signal input from the HID 31, or the designation of the power control mode determined according to the operation signal may be canceled. The drive control unit 403 controls the operation of the cooling fan 73 according to the power control mode determined by the performance control unit 217 in the manner mentioned above. For example, making the low noise mode (Q) selectable according to an operation can operate the information processing apparatus 1 in a manner suitable for a quiet environment, such as a library or a work room.

Further, in the above description, the case where the information processing apparatus 1 includes one CPU is taken as an example, but the present invention is not limited to this example. The number of CPUs may be two or more, and any other type of processors, such as one or more GPUs (Graphics Processing Units), may be included. The performance control unit 217 has only to control the power control mode and the power consumption according to the state of each of the processors.

While the embodiment of this invention is described in detail with reference to the accompanying drawings, the specific configurations are not limited to those in the above-described embodiment, and design changes and the like are also included without departing from the scope of this invention. The respective configurations described in the above embodiment can be combined arbitrarily.

The invention claimed is:

1. An information processing apparatus comprising:
a processor which takes a plurality of power control modes having a different rated power from each other;
a fan which rotates to dissipate heat generated by the processor; and
a power control unit which controls power consumption of the processor, wherein
the plurality of power control modes includes two or more stages of dynamic control modes having a different rated power from each other and includes a unified communication mode,
the power control unit selects one of the dynamic control modes based on an event in which a power consumption state of the processor continues for at least a predetermined duration,
when unified communication works in the apparatus, the power control unit selects the unified communication mode,
when launch of a unified communication application program is instructed by the apparatus, the power control unit selects the unified communication mode,
when end of operation of the unified communication application program is instructed by the apparatus, the power control unit selects one of the dynamic control modes, and further comprising:
an operation unit which accepts an operation of the apparatus; and
a display unit which displays a screen, wherein
the processor is configured to execute an operation based on the unified communication application program and to execute another operation based on another application program,
when a screen display based on the unified communication application program is selected with the operation, the power control unit selects the unified communication mode, and
when a screen display based on the another application program is selected with the another operation, the power control unit selects one of the dynamic control modes.

2. The information processing apparatus according to claim 1, further comprising a temperature control unit which controls temperature of the apparatus via the fan,
wherein output of the fan in the unified communication mode is equal to or less than a minimum value of output of the fan in any of the dynamic control modes.

3. An information processing apparatus comprising:
a processor which takes a plurality of power control modes having a different rated power from each other;
a fan which rotates to dissipate heat generated by the processor; and
a power control unit which controls power consumption of the processor, wherein
the plurality of power control modes includes two or more stages of dynamic control modes having a different rated power from each other and includes a unified communication mode,
the power control unit selects one of the dynamic control modes based on an event in which a power consumption state of the processor continues for at least a predetermined duration,
when unified communication works in the apparatus, the power control unit selects the unified communication mode,
wherein a short-term power limit of the unified communication mode is lower than short-term power limits of each of the dynamic control modes.

4. An information processing apparatus comprising:
a processor which takes a plurality of power control modes having a different rated power from each other;
a fan which rotates to dissipate heat generated by the processor; and
a power control unit which controls power consumption of the processor, wherein
the plurality of power control modes includes two or more stages of dynamic control modes having a different rated power from each other and includes a unified communication mode,
the power control unit selects one of the dynamic control modes based on an event in which a power consumption state of the processor continues for at least a predetermined duration,
when unified communication works in the apparatus, the power control unit selects the unified communication mode,
wherein the rated power of the unified communication mode is higher than a minimum value of the rated power of each of the dynamic control modes.

5. The information processing apparatus according to claim 4, wherein when a dynamic control mode higher in rated power than the rated power of unified communication mode is selected, and when a transition to the unified communication mode occurs, the power control unit changes over time the rated power of the dynamic control mode before the transition to the unified communication mode up to a predetermined rated power of the unified communication mode.

* * * * *